3,355,244
PRODUCTION OF VANADIUM OXYTRICHLORIDE
Thomas R. Carter and Frederick Fahnoe, Ashtabula, Ohio, and Eugene P. Supinski, Tuscola, Ill., assignors to National Distillers and Chemical Corporation, New York, N.Y., a corporation of Virginia
No Drawing. Filed May 14, 1965, Ser. No. 455,977
13 Claims. (Cl. 23—17)

ABSTRACT OF THE DISCLOSURE

A process for the preparation of vanadium oxytrichloride by maintaining vanadium oxide, a carbonaceous material and an inert diluent in a fluidized bed and fluidizing the bed with chlorine.

---

This invention relates to the production of vanadium oxytrichloride by chlorination of vanadium oxide ores. More particularly, this invention pertains to the production of vanadium oxytrichloride by fluidized bed chlorination of vanadium oxide.

In recent years, various metal chlorides have been prepared by the interaction of the corresponding metal oxides and chlorine in the presence of carbon or equivalent carbonaceous reducing agents at an elevated temperature. One of the most commercially successful processes for producing such metal chlorides has been the fluidized bed technique wherein the metal oxide or an ore containing the metal oxide and carbon are fed into the reaction zone in a comminuted or finely divided form and simultaneously feeding chlorine into or near the bottom of the reaction zone so that the solids are maintained in contact with the gas in a non-static or fluidized condition. Such an operation is often referred to as a bubbling or fluidized bed, since the gases move upwardly through the solids similar to the conditions prevailing in the boiling of a liquid when heating the bottom of a container. Because of the movement of the finely divided solids in the bed, a substantially uniform temperature tends to be established throughout the depth of the fluidized bed. The reaction produces the metal chloride, carbon monoxide, carbon dioxide as well as by-product metal chlorides depending upon the presence of metal impurities in the metal oxide feed material. These gaseous reaction products are passed to a separation system wherein the desired metal chloride is recovered.

The chlorination of vanadium oxide materials, and especially vanadium pentoxides, in a fluidized bed system utilizing known procedures has proved to be difficult. It was found, for example, that vanadium oxide beds, in all size ranges, fluidized poorly at best with much channeling and slugging. This characteristic was attributed to the dendritic shape of vanadium oxide crystals. In correlated studies, again utilizing a substantially purified form of vanadium pentoxide, the fusion temperature of the vanadium oxide under fluidized conditions was found to be about 1200° F. In view of the known exothermic nature of the vanadium oxide-chlorine reaction and the poor fluidizing characteristics of the vanadium oxide, this raised serious questions as to whether it was practical to fluidize vanadium oxide, i.e. vanadium pentoxide, on a commercial production basis without the undue risk of sintering the bed as well as encountering other fluidizing problems.

One object of the present invention is to provide an effective fluidized bed process for the production of vanadium oxytrichloride.

Another object of the present invention is to provide a process for the production of vanadium oxytrichloride by the chlorination of vanadium oxide in a fluidized bed reaction.

A further object of the present invention is to provide a method of maintaining a fluidized bed of vanadium pentoxide in the production of vanadium trioxychloride.

These and other objects of the present invention will become readily apparent from the ensuing description and illustrative embodiments.

In accordance with the present invention it has now been found that vanadium oxide particles can be effectively employed in a fluidized bed process provided a finely divided, inert solid diluent is admixed with the vanadium oxide feed material. Although it will be understood that various vanadium oxides, with the vanadium metal having different valences, and such vanadium oxide-containing ores may be employed in the present process, the use of vanadium pentoxide or ores containing vanadium pentoxide are the preferred starting materials. For the purpose of convenience, therefore, the invention will be more specifically described and illustrated with respect to the use of the vanadium pentoxide feed materials.

The particle size of the vanadium pentoxide as well as the amount of vanadium pentoxide undergoing chlorination in the fluidized bed were further found to be critical features of the present process. More specifically, it was found that the vanadium pentoxide particle size had a highly significant bearing on the sintering tendencies of the fluidized bed, and that the presence of a large proportion of vanadium pentoxide fines of less than about 75 microns in size (—200 mesh size) actually promoted sintering. Consequently, it is important to employ a finely divided vanadium oxide feed material which has been subjected to a screening or other separation technique to remove metal oxide particles having a size of less than about 75 microns (—200 mesh size). In general, the vanadium oxide or oxide-containing ore will be subdivided so that the particle size will range from about 2000 to 50 microns, and preferably from about 850 to 100 microns (—20 to +150 mesh).

As set forth above, the percentage of the vanadium oxide particles in the fluodized bed has also been found to be an important factor in successful operations. In general, fluidizing efficiency and the rate of vanadium trioxychloride production were enhanced by maintaining the vanadium oxide loading from about 10 to 15% by weight based on the total weight of the fluidized bed. If the amount of the vanadium oxide exceeds 15% by weight, slugging and channeling tend to occur at all gas flows above the incipient fluidization point. This aspect of the present invention will be specifically illustrated below.

Another critical feature of the present process is the purity of the starting material vanadium pentoxide. More specifically, it was found that the vanadium pentoxide purity had a highly significant bearing on the sintering tendencies of the bed and that impurities such as salts of sodium and potassium in the vanadium pentoxide actually promoted sintering approximately in proportion to the percentage of these impurities in the starting $V_2O_5$. Accordingly, it is important that high purity vanadium pentoxide be employed as the starting material. The preferred starting material is non-hygroscopic crystalline vanadium pentoxide with a minimum $V_2O_5$ content of 96 percent by weight, a bulk density of 80 to 120 pounds per cubic foot, and a particle size wherein 95 percent will pass through a 20 mesh sieve (850 micron) and remain on a 150 mesh sieve (100 micron). The especially preferred starting material has a $V_2O_5$ content in excess of 98 percent by weight.

The preferred inert, solid diluent of this invention is alundum, a substantially pure fused aluminum oxide.

The finely divided alundum will have a particle size within the range of about 75 to 850 mircons, and preferably about 150 to 250 microns. It will be understood, however, that other inert, solid diluents having the aforedescribed particle size range and melting points higher than the maximum reaction temperature may also be effectively employed in the present process. Such other diluents include fused silica, fused zirconia, etc., and the like. The amount of the finely divided, solid, inert diluent will generally range from about 85% by weight or higher, based on the total weight of the fluidized bed. In accordance with the preferred method of carrying out the process of this invention, the total amount of diluent in the fluidized bed will range from about 85 to 89% by weight.

The other solid component is the powdered carbon, coke, anthracite or equivalent carbonaceous material having a particle size within the range of about 100 to 2000 microns, and preferably about 250 to 850 microns. The carbonaceous material is employed as a comparatively minor amount which generally will be less than about 2.0% by weight, based on the total weight of the solid fluidized bed components. For preferred operating conditions, the carbonaceous material will be employed in amounts ranging from about 1.0 to 1.5% by weight. Although the particular type of carbonaceous material utilized is not a critical feature of this invention, coke, and especially calcined petroleum coke, is preferred.

In general, the production of vanadium oxytrichloride by the fluidized bed process of this invention initially comprises adding the entire charge of alundum to a fluidized bed reactor. The finely divided alundum particles are fluidized with dry air or an inert gas such as nitrogen, argon, and the like. External heat is then applied to the fluidized bed by conventional means until a bed temperature of about 800° to 900° F. is reached. At this point, the vanadium pentoxide feed material and the carbonaceous material, e.g. coke, are fed either separately or in admixture to the reactor. When the temperature of the fluidized bed reaches about 850° to 1000° F., and preferably about 900° to 950° F., the chlorine flow is initiated and the air or other inert gas flow is reduced. The chlorine gas flow rate may vary from about 5 to 7 s.c.f.m. per square foot of bed cross-sectional area, although broadly speaking it may range from about 4 to 10 s.c.f.m. per square foot of bed cross-sectional area. The air or inert gas flow will, on the other hand, range from about 0.5 to 8 s.c.f.m. per square foot of bed cross-sectional area and preferably from about 1 to 3 s.c.f.m. per square foot of bed cross-sectional area. At times, it is also possible to discontinue the air or inert gas flow entirely without encountering any adverse fluidizing or chlorination effects.

Following initiation of the chlorination reaction it is essential that the temperature of the bed be held at a range between 900° F. and 1100° F. and preferably between 950° F. and 1050° F. This may be accomplished, for example, by applying external heat or cooling to the reactor shell.

Although the preferred method of practicing the present invention involves a continuous operation, it is also possible to operate the system on a semi-continuous or batch basis. In a continuous operation, the vanadium pentoxide and the coke, preferably in the form of a previously prepared admixture, are fed into the reaction zone to maintain in the fluidized bed a vanadium pentoxide-coke level of about 5 to 25% by weight, and preferably about 10 to 15% by weight.

It will be further understood that the exact method of starting up, the order of solids addition, the method of maintaining the reaction temperature within the preferred range of about 950° F. to 1050° F., and the method of recovering the vanadium oxytrichloride from the gaseous reaction products are not critical features of the present invention. Thus, for example, conventional procedures can be employed in the recovery and purification of the vanadium oxytrichloride product. More specifically, the gaseous reaction products recovered overhead from the above-described fluidized bed reaction zone may be initially passed into a cyclone separator to remove any entrained solids. The resulting crude vanadium oxytrichloride gases are then fed to a quench condenser wherein they are quenched in a counter current circulating stream of liquid vanadium oxytrichloride. The condensed vanadium oxytrichloride product may then be subsequently treated, e.g. by fractional distillation, to obtain a highly purified vanadium oxytrichloride product.

The invention will be more fully understood by reference to the following illustrative embodiments.

Example I

The following runs were carried in a one inch diameter Vycor tube using a tube furnace for the heat source.

(A) Vanadium pentoxide having a particle size ranging from minus 80 to plus 200 mesh (185 to 75 microns) was admixed with coke having a particle size of 20 to 60 mesh (850 to 250 microns) in a weight ratio of 9 to 1. The resulting admixture was fluidized in the Vycor tube wtih a chlorine-air gas mixture passed through the bed at about .04 s.c.f.m. Reaction occurred at a temperature of about 950° F., and the temperature rose rapidly to 1100° F. causing almost immediate sintering of the bed.

(B) In this run the same operating conditions were employed as in Run A with the exception that the fluidized bed was composed of 50% by weight of finely divided alundum having a particle size of minus 150 mesh (100 microns) and 50% by weight of the vanadium pentoxide-coke mixture (9 to 1 weight ratio). A rapid increase in temperature was again noted with the result that sintering occurred almost immediately following the reaction kick-off at 950° F.

(C) The same conditions as Run B were employed with the exception that the fluidized bed was composed of 85% by weight of alundum having a minus 150 mesh (100 microns) particle size and 15% by weight of the vanadium pentoxide-coke mixture. The reaction started at a temperature of about 900° F. and increased to about 1050° F. during the reaction period. No fusion or sintering was encountered during the reaction, and vanadium oxytrichloride was present in the reaction product gases.

The above data show that a fluidized bed consisting only of vanadium pentoxide and coke would be difficult, if not impossible, to control in a chlorination process for the production of vanadium oxytrichloride. The data further demonstrate that the use of a finely divided, inert, solid diluent such as alundum will permit an effective operation, provided that a certain minimum amount of the diluent is maintained in the bed during the chlorination reaction.

Example II

In the following runs the chorination system consisted of an Inconel reactor with a two foot reaction chamber four inches in diameter, and a two foot disengaging chamber thirteen inches in diameter. The chlorine and inert gas were introduced through a perforated diffusion plate at the bottom of the reaction zone. The solid reactants, the vanadium pentoxide and coke, as well as make up alundum, if necessary, were fed into the top of the reactor by means of a screw feeder. The gaseous reaction products were removed from the upper portion of the reaction zone and passed into a cyclone where entrained solids, if present, were removed. The reaction product gases were next quenched with liquid vanadium oxytrichloride and passed to a storage tank.

(A) Approximately five pounds of finely divided alundum having a particle size of 85 microns (180 mesh) was fluidized with dry air passed into the reaction zone at 0.65 s.c.f.m. The fluidized bed was heated externally to a temperature of 800° F., and 3.5 pounds of alundum plus 1.5 pounds of $V_2O_5$-coke mixture (90% by weight of −80 to +200 mesh $V_2O_5$ and 10% by weight of −20 to +100 mesh coke) were added. The bed composition was 85% by weight of alundum, 13.5% by weight of $V_2O_5$, and 1.5% by weight of carbon. External heating was continued until a temperature of about 1000° F. was reached. Chlorine gas was then introduced at a velocity of about 0.4 s.c.f.m., and the flow of dry air was reduced to about 0.13 s.c.f.m. During the run the reaction temperature fluctuated between about 850° and 1000° F., while the air flow was varied from about 0.13 to 0.65 s.c.f.m. The total feed of the 9 to 1 $V_2O_5$-coke mixture was about 11,000 grams, and vanadium oxytrichloride was continuously produced during this period. No evidence of bed sintering was found.

(B) In a second run carried out under the same conditions of Run A the bed life was only 11 hours and vanadium oxytrichloride product decreased markedly. It was found that this poor reactor performance was due to the presence in the vanadium pentoxide feed of a fine mesh particle size of minus 200 mesh. The usual screening operation previously employed to remove such particles had been omitted. When the minus 200 mesh vanadium pentoxide was removed by screening in subsequent operations, an immediate improvement in reactor performance was noted.

The above data reveals that the fluidized bed process of this invention can be effectively employed for the production of vanadium oxytrichloride. The foregoing also demonstrates that particle size of the vanadium oxide feed material is another important factor in this process.

As previously discussed, the vanadium oxytrichloride product may be recovered and used as such or subjected to a specific purification treatment such as fractional distillation to obtain a high purity product. Utilizing fractional distillation, for example, it was found that recovery efficiency from crude to purified vanadium oxytrichloride was 94%. The entrained solids content of the crude vanadium oxytrichloride was analyzed as 0.8%. Some loss of product resulted from sampling, spillage, heavy end and vent losses. Analysis of the purified vanadium oxytrichloride revealed that any metallic impurities were present in amounts of less than about 0.01% by weight, which is far below contaminating levels.

While particular embodiments of this invention are shown above, it will be understood that the invention is obviously subject to variations and modifications without departing from its broadest aspects.

What is claimed is:

1. A process of preparing vanadium oxytrichloride which comprises establishing a fluidized bed in a reaction zone, said bed comprising less than about 15% by weight finely divided vanadium pentoxide, less than about 2% by weight of a finely divided carbonaceous material, and the remainder being an inert, finely divided, solid diluent fluidizing said bed with chlorine at a gas velocity sufficient to maintain said bed in a fluidized state, maintaining a reaction temperature in said bed within the range of about 950° to 1050° F., and recovering reaction product gases containing vanadium oxytrichloride.

2. The process of claim 1 wherein said vanadium pentoxide has a minimum $V_2O_5$ content of 96% by weight.

3. The process of claim 1 wherein said carbonaceous material is coke.

4. The process of claim 1 wherein said inert, solid diluent is alundum.

5. The process of claim 1 wherein said bed is also fluidized with air.

6. The process of claim 1 wherein said velocity is about 5 to 7 s.c.f.m. per square foot of bed cross-sectional area.

7. A process of preparing vanadium oxytrichloride which comprises establishing a fluidized bed in a reaction zone, said bed comprising less than 15% by weight of high purity vanadium pentoxide having a particle size within the range of 50 to 2000 microns, less than 2% by weight of coke having a particle size within the range of 100 to 2000 microns, and about 85 to 90% by weight of an inert, solid diluent having a particle size within the range of about 75 to 850 microns, fluidizing said bed with chlorine gas at a gas velocity of about 5 to 7 s.c.f.m. per square foot of bed cross-sectional area, maintaining a reaction temperature in said bed of about 950° to 1050° F., and recovering overhead reaction product gases containing vanadium oxytrichloride.

8. The process of claim 7 wherein said inert, solid diluent is alundum.

9. The process of claim 7 wherein said bed is fluidized with an admixture of chlorine gas and air.

10. A continuous process for the production of vanadium oxytrichloride which comprises establishing a fluidized bed in a reaction zone, said bed comprising about 9.0 to 13.5% by weight of high purity vanadium pentoxide having a particle size within the range of about 100 to 850 microns, about 1.0 to 1.5% by weight of a finely divided carbonaceous material having a particle size within the range of about 250 to 850 microns, and about 85 to 90% by weight of an inert, solid dilent having a particle size within the range of about 150 to 250 microns, continuously fluidizing said bed with chlorine gas at a gas velocity within the range of about 5 to 7 s.c.f.m. per square foot of bed cross-sectional area, continuously feeding said vanadium oxide and carbonaceous material to said fluidized bed to maintain the vanadium oxide-carbonaceous material content within the range of about 10 to 15% by weight, maintaining a reaction temperature in said bed within the range of 950° to 1050° F., and continuously recovering reaction product gases containing vanadium oxytrichloride.

11. The continuous process of claim 10 wherein said vanadium pentoxide has a minimum $V_2O_5$ content of 96% by weight.

12. The continuous process of claim 10 wherein said carbonaceous material is coke.

13. The continuous process of claim 10 wherein said inert, solid diluent is alundum.

References Cited
UNITED STATES PATENTS

| | | | |
|---|---|---|---|
| 3,097,923 | 7/1963 | Arkless | 23—202 |
| 3,153,572 | 10/1964 | Dunn | 23—87 |

MILTON WEISSMAN, *Primary Examiner.*

EDWARD STERN, *Examiner.*